United States Patent
Yoon et al.

(10) Patent No.: US 8,252,452 B2
(45) Date of Patent: Aug. 28, 2012

(54) SECONDARY BATTERY OF NOVEL STRUCTURE AND BATTERY PACK HAVING THE SAME

(75) Inventors: Junill Yoon, Seoul (KR); Heekook Yang, Daejeon (KR); Jisang Yu, Daejeon (KR); John E. Namgoong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1143 days.

(21) Appl. No.: 11/446,015

(22) Filed: Jun. 2, 2006

(65) Prior Publication Data

US 2006/0286450 A1    Dec. 21, 2006

(30) Foreign Application Priority Data

Jun. 3, 2005 (KR) .................. 10-2005-0047765

(51) Int. Cl.
*H01M 2/00* (2006.01)
*H01M 6/42* (2006.01)
*H01M 6/46* (2006.01)
*H01M 6/00* (2006.01)
*H01M 10/00* (2006.01)

(52) U.S. Cl. ........ 429/148; 429/122; 429/149; 429/151; 429/152

(58) Field of Classification Search .................. 429/120, 429/148
See application file for complete search history.

(56) References Cited

U.S. PATENT DOCUMENTS

| | | | |
|---|---|---|---|
| 5,501,918 A * | 3/1996 | Gruenstern et al. | 429/120 |
| 6,254,648 B1 | 7/2001 | Noh et al. | |
| 6,411,063 B1 | 6/2002 | Kouzu et al. | |
| 6,569,556 B2 | 5/2003 | Zhou et al. | |
| 2003/0162091 A1 | 8/2003 | Watanabe et al. | |
| 2006/0132101 A1 * | 6/2006 | Ambrosio et al. | 320/150 |
| 2006/0234119 A1 * | 10/2006 | Kruger et al. | 429/160 |

FOREIGN PATENT DOCUMENTS

| | | |
|---|---|---|
| EP | 1071147 A1 | 1/2001 |
| JP | 11016546 A | 1/1999 |
| JP | 2004103258 A | 4/2004 |
| JP | 2005122927 A | 5/2005 |
| TW | 1579614 | 11/2004 |
| WO | 2005/074054 A1 | 8/2005 |
| WO | 2006038697 A1 | 4/2006 |

* cited by examiner

*Primary Examiner* — Barbara Gilliam
*Assistant Examiner* — Steven Scully
(74) *Attorney, Agent, or Firm* — Birch, Stewart, Kolasch & Birch, LLP

(57) ABSTRACT

Disclosed herein are a secondary battery including an electrode assembly for charging and discharging mounted in a sheathing member including a metal layer and a resin layer, wherein the secondary battery further includes a secondary battery having a molding part of a predetermined thickness at least partially formed at the outside of a sheathing member, preferably, at a sealing region of the sheathing member, and a medium- or large-sized battery pack including the same. The molding part is formed at the outside of the sheathing member of the secondary battery. Consequently, the secondary battery according to the present invention has high mechanical strength, and therefore, it is possible to construct a battery pack without using addition members, such as cartridges. When the molding part is formed at the sealing region, which is weak, the molding part increases the mechanical strength and the sealing force of the secondary battery. Consequently, a battery pack including the secondary batteries as unit cells can be manufactured generally in a compact structure and with relatively small weight, and the assembly process of the battery pack is greatly simplified. The battery pack according to the present invention has high structural stability. Consequently, the battery pack can be preferably used as a power source for electric vehicles, hybrid electric vehicles, electric motorcycles, and electric bicycles.

16 Claims, 14 Drawing Sheets

PRIOR ART

SECONDARY BATTERY OF NOVEL STRUCTURE AND BATTERY PACK HAVING THE SAME

FIELD OF THE INVENTION

The present invention relates to a secondary battery of a novel structure and a battery pack having the same, and, more particularly, to a secondary battery including a molding part, having a predetermined thickness, formed at the outside of a sheathing member, which serves as a battery case, preferably, at a sealing region of the sheathing member, thereby providing improved mechanical strength and improved sealability, and a battery pack including such a secondary battery, whereby the structural stability of the battery pack is excellent, the battery pack is compact and lightweight, and the assembly process of the battery pack is simplified.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery pack having a plurality of battery cells electrically connected with each other because high output and large capacity is necessary for the medium- or large-sized devices.

Preferably, the medium- or large-sized battery pack is manufactured with small size and small weight if possible. For this reason, a rectangular battery or a pouch-shaped battery, which can be stacked with high integration and has a small weight to capacity ratio, is usually used as a battery cell of the medium- or large-sized battery pack. Especially, much interest is currently generated in the pouch-shaped battery, which uses an aluminum laminate sheet as a sheathing member.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper end and the lower end of a battery cell 13, respectively, while the electrode leads 11 and 12 are opposite to each other. A sheathing member 14 comprises upper and lower sheathing parts. That is, the sheathing member 14 is a two-unit member. An electrode assembly (not shown) is received in a receiving part, which is defined between the upper and lower sheathing parts of the sheathing member 14. The opposite sides 14a and upper and lower ends 14b and 14c, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14a and upper and lower ends 14b and 14c of the upper and lower sheathing parts of the sheathing member 14, which are in contact with each other, to each other by applying heat and pressure to the opposite sides 14a and upper and lower ends 14b and 14c of the upper and lower sheathing parts of the sheathing member 14 so as to weld the resin layers to each other. According to circumstances, the opposite sides 14a and upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper and lower ends 14b and 14c of the sheathing member 14, on the other hand, the electrode leads 11 and 12 protrude from the upper and lower ends 14b and 14c of the sheathing member 14. For this reason, the upper and lower ends 14b and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability.

In the pouch-shaped battery 10, however, the battery cell 13 repeatedly expands and contracts during the charge and the discharge of the pouch-shaped battery 10. As a result, the thermally welded regions of the upper and lower ends 14b and 14c, especially the opposite sides 14a, of the upper and lower sheathing parts of the sheathing member 14, are easily separated from each other. Furthermore, the mechanical strength of the sheathing member 14 is low. In order to solve this problem, there have been proposed a method of applying an epoxy resin or a silicon resin to the outside sealing region of the sheathing member 14, and a method of mounting batteries in additional members having sufficient mechanical strength, respectively, and stacking the additional members one on another.

However, the above-mentioned methods do not provide high sealing force. Furthermore, when the above-mentioned methods are used, the total weight and the total size of the battery pack are increased, and the assembly process of the battery pack is very complicated.

SUMMARY OF THE INVENTION

Therefore, the present invention has been made to solve the above problems, and other technical problems that have yet to be resolved.

Specifically, it is an object of the present invention to provide a secondary battery of a novel structure that is capable of increasing the mechanical strength of a sheathing member, and, preferably, further increasing a sealing force at a sealing region of the sheathing member in a thin-type battery, such as a pouch-shaped battery.

It is another object of the present invention to provide a secondary battery of a novel structure that can be stacked on other secondary batteries, without the use of additional members, so as to constitute a battery pack.

It is yet another object of the present invention to provide a battery pack including the above-mentioned secondary battery, whereby the structural stability of the battery pack is excellent, the battery pack is generally compact and lightweight, and the assembly process of the battery pack is simplified.

In accordance with one aspect of the present invention, the above and other objects can be accomplished by the provision of a secondary battery comprising an electrode assembly for charging and discharging mounted in a sheathing member including a metal layer and a resin layer, wherein the secondary battery further comprises: a molding part, having a predetermined thickness, at least partially formed at the outside of the sheathing member.

The secondary battery according to the present invention is a thin-type secondary battery generally having a small thickness, and the secondary battery has a sheathing member, which constitutes a battery case, constructed, preferably, in a laminate structure including a metal layer and a resin layer. A typical example of such a secondary battery is a pouch-shaped battery using a laminate sheet made of aluminum and resin as a sheathing member. The sheathing member of the pouch-shaped battery may be constructed in various structures. For example, the sheathing member of the pouch-shaped battery may be constructed in a structure in which an electrode assembly is received in a receiving part formed at the upper inner surface and/or the lower inner surface of a one-unit folding type member, and the upper and lower contact regions are sealed, or in a structure in which an electrode assembly is received in a receiving part formed at the upper inner surface and/or the lower inner surface of a two-unit member, and the upper and lower contact regions are sealed. A pouch-shaped battery with the above-stated structure is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises a cathode and an anode, by which the charge and the discharge of the battery are possible. The electrode assembly is constructed in a structure in which the cathode and the anode are stacked while a separator is disposed between the cathode and the anode. For example, the electrode assembly is constructed in a jelly-roll type structure or in a stack type structure. The cathode and the anode of the electrode assembly may be constructed such that an electrode tap of the cathode and an electrode tap of the anode directly protrude outward from the battery. Alternatively, the cathode and the anode of the electrode assembly may be constructed such that the electrode tap of the cathode and the electrode tap of the anode are connected to additional electrode leads, and the electrode leads protrude outward from the battery. The protruding direction of the electrode taps or the electrode leads is not particularly restricted. For example, the electrode taps or the electrode leads may protrude together from the upper end of the battery, the electrode taps or the electrode leads may protrude from the upper and lower ends of the battery, respectively, while the electrode taps or the electrode leads are opposite to each other, or the electrode taps or the electrode leads may protrude from the upper end and the side of the battery, respectively, such that the electrode taps or the electrode leads are perpendicular to each other.

One of the characteristics of the present invention is that, as previously described, the molding part having the predetermined thickness is at least partially formed at the outside of the sheathing member. Consequently, the molding part provides high structural stability, whereby the mechanical strength of the sheathing member is increased, and therefore, the battery module is appropriately manufactured.

Preferably, the molding part is at least partially formed at the outside sealing region of the sheathing member. The molding part increases the mechanical strength of the sheathing member. Furthermore, the molding part increases the sealing force at the sealing region of the sheathing member, thereby preventing permeation of moisture and leakage of an electrolyte. Generally, when the upper and lower sheathing members constructed in the laminate structure are sealed with each other, the contact regions of the upper and lower sheathing members are integrally attached to each other by applying heat and pressure to the contact regions of the upper and lower sheathing members. Consequently, in the case that the molding part is formed at the sealing region such that the sealing region is wrapped by the molding part, the sealing force is further increased. In a preferred embodiment, the molding part may be formed at the opposite side sealing regions of the sheathing member. Alternatively, the molding part may be formed at the opposite side sealing regions, the upper end sealing region, and/or the lower end sealing region of the sheathing member. The molding part formed at the upper end sealing region and the lower end sealing region of the sheathing member serves to increase the sealing force of the pouch-shaped battery and to further increase the mechanical strength of the pouch-shaped battery.

The predetermined thickness means a dimension greater than the thickness of the tightly coupled sheathing member. Preferably, the molding part has a thickness greater than that of the battery cell. In the case that the thickness of the molding part is greater than that of the battery cell, as described above, batteries can be stably stacked one on another while the batteries are spaced a predetermined distance from each other due to the molding part. As a result, a shock-absorbing region for accepting the change in thickness of the battery cell during the charge and discharge of the battery is formed, and, furthermore, a coolant flow channel for removing heat generated from the battery cell during the charge and discharge of the battery is formed. The coolant is a material for accomplishing heat dissipation from the battery cell. For example, the coolant may be air or liquid.

In a preferred embodiment, the molding part is formed along the entireties of the opposite side sealing regions of the sheathing member, and therefore, the structural stability is further improved when a plurality of secondary batteries are stacked one on another so as to manufacture a battery pack. According to circumstances, the molding part may be formed along the entireties of the opposite side sealing regions of the sheathing member, and, at the same time, additional molding parts, which are identical to the above-described molding part, may be coupled to the upper end part and/or the lower end part of the sheathing member.

Forming of the molding part at the outside of the sheathing member is accomplished, for example, by sealing the contact regions of the upper and lower sheathing parts of the sheathing member, placing the corresponding outside of the battery in the mold, and injecting a molten material, a thermosetting and/or ultraviolet-setting material, or a dehydration-setting material such that the molten material, the thermosetting and/or ultraviolet-setting material, or the dehydration-setting material can be integrally formed at the corresponding outside of the battery while the molten material, the thermosetting and/or ultraviolet-setting material, or the dehydration-setting material has a predetermined thickness. The material for the molding part is not particularly restricted so long as the molding part can be formed with the predetermined thickness, and the molding part can be securely attached to the outside of the sheathing member. A typical example of the material for the molding part is plastic resin, although clay and concrete may also be used as the material for the molding part. The plastic resin may be formed (molded) at the outside sealing region of the sheathing member in various states, such as monomer, oligomer, paste, and molten polymer. According to circumstances, filler for increasing strength may be further contained in the plastic resin. For example, thermoplastic resin, such as polyethylene, polypropylene, polystyrene, or polycarbonate, is applied in a molten state, and is then cooled such that the thermoplastic resin is hardened. Alternatively, thermosetting and/or ultraviolet-setting resin, such as epoxy resin or phenol resin, may be applied in a liquid slurry state, and may be then hardened using a catalyst, heat, or ultraviolet rays. However, kinds of resin are not particularly restricted so long as the molding part according to the present invention can be formed using the selected resin.

Although the molding part may be formed along the outside of the sheathing member such that the molding part has a predetermined thickness, the molding part may be provided with at least one depression having relatively small thickness, by which at least one uniform coolant flow channel is formed when a plurality of batteries are stacked one on another so as to manufacture a battery pack.

According to circumstances, one or more coupling parts, which are selected from a group consisting of coupling steps, coupling grooves, and through-holes, may be formed at the molding part such that, when a plurality of secondary batteries are stacked one on another so as to manufacture a battery pack, the coupling between the stacked batteries is more easily accomplished and/or the stacked batteries can be securely mounted to an interior member for the battery pack (e.g., a battery pack housing). The location of the coupling parts may be varied depending upon the coupling fashion.

In accordance with another aspect of the present invention, there is provided a medium- or large-sized battery pack constructed by stacking a plurality of secondary batteries with the above-stated construction one on another.

The battery pack according to the present invention is constructed in a structure in which two or more secondary batteries (unit cells) are stacked one on another and are electrically connected with each other for the purpose of high output and large capacity. The stacking of the unit cells may be accomplished in a structure in which the unit cells are in direct contact with each other, such that the unit cells face each other, without using additional members, or in a structure in which one or more unit cells are mounted to an additional member, and a plurality of additional members are stacked one on another. When the thickness of the above-described molding part is greater than that of the battery cell, and the molding part is formed at two or more positions of the sheathing member, the unit cells can be stacked one on another without using additional members. Consequently, it is possible to manufacture a battery pack having a compact and lightweight structure.

According to circumstances, the battery pack may be manufactured by arranging the unit cells at a predetermined interval, and integrally forming the molding part at at least a portion of the outside of each unit cell. This battery pack is different from the previously described battery pack in that the molding part is formed after the unit cells are stacked one on another. The molding part of this battery pack may have various structures, as previously described. Specifically, the molding part may be formed along the entireties of the opposite side sealing regions of the respective unit cells, or may be selectively formed at the upper and lower end sealing regions of the respective unit cells. Also, the molding part may be provided with depressions (herein, through passages) having relatively small thickness, by which coolant flow channels are formed between the unit cells. Furthermore, coupling steps, coupling grooves, or through-holes may be selectively formed at the molding part such that, the unit cells can be easily mounted to an interior member for the battery pack (e.g., a battery pack housing).

Preferably, the medium- or large-sized battery pack according to the present invention is used as a power source for devices, such as electric vehicles, hybrid electric vehicles, electric motorcycles, and electric bicycles, which require high-output, large-capacity power and to which various external forces, such as vibrations and impacts, are applied.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
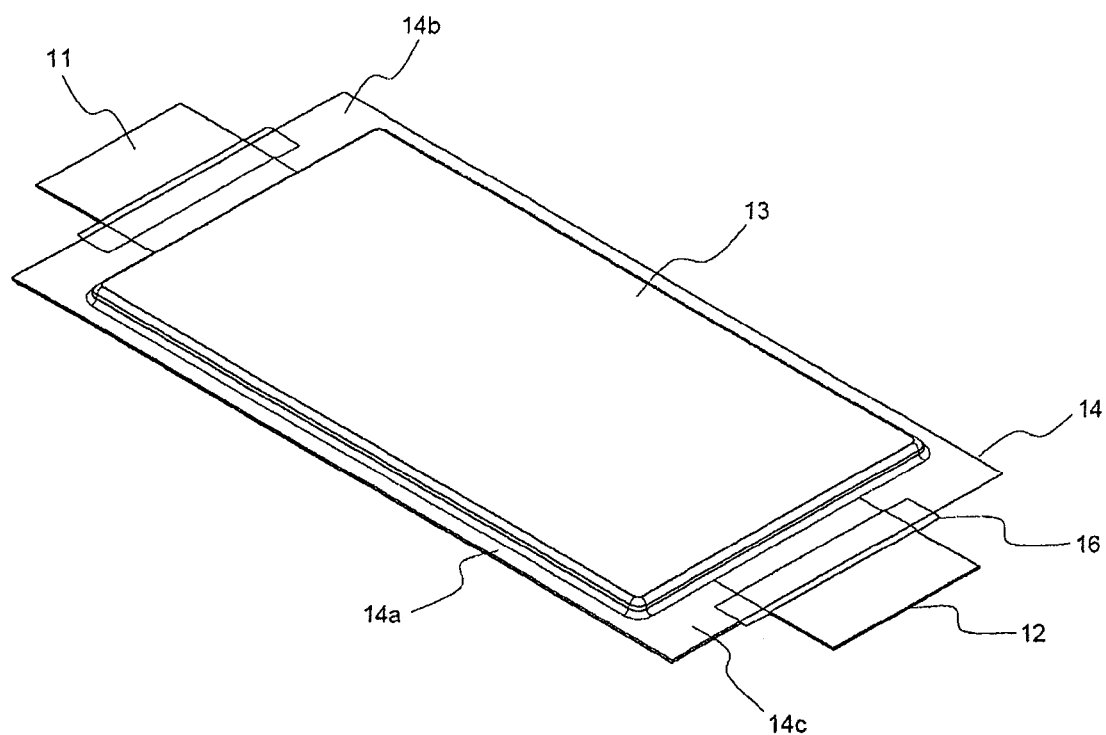
FIG. 1 is a perspective view illustrating a conventional representative pouch-shaped battery.
Figure 2:
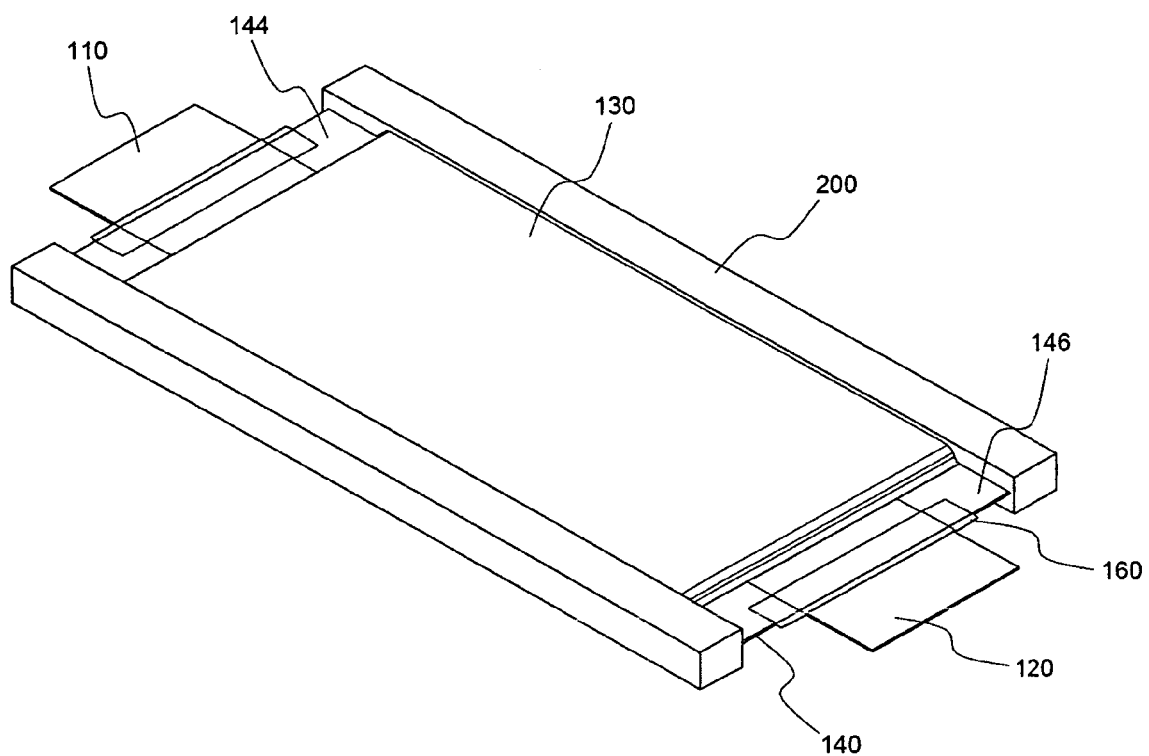
FIG. 2 is a perspective view illustrating a secondary battery according to a preferred embodiment of the present invention.

FIG. 2 is a perspective view illustrating a secondary battery according to a preferred embodiment of the present invention. Referring to FIG. 2, the secondary battery 100 is constructed such that the opposite sides, the upper end part 144, and the lower end part 146 are sealed while an electrode assembly (not shown) is mounted between a two-unit pouch-shaped sheathing member 140, and cathode and anode leads 110 and 120 protrude from the upper end and the lower end of the battery 100, respectively. Between the electrode leads 110 and 120 and the sheathing member 140 is interposed a film-shaped sealing member 160 for increasing sealability between the electrode leads 110 and 120 and the sheathing member 140. At the opposite side sealing regions of the battery 100 is formed a molding part 200 having a thickness slightly greater than that of the battery cell 130 such that the molding part 200 uniformly extends along the entireties of the opposite sides of the battery cell 130. The side molding part 200 further increases a sealing force at the opposite side sealing regions, which are relatively weak, and, at the same time, increases the mechanical strength of the battery 100. Moreover, the molding part 200 serves as a frame when a plurality of secondary batteries 100 are stacked one on another so as to manufacture a high-output, large-capacity battery pack. The side molding part 200 may be manufactured by thermally welding the sealing regions at the opposite sides, the upper end part 144, and the lower end part 146 of the sheathing member 140, placing the opposite side sealing regions in a mold (not shown), and injecting molten resin into the mold using an insert injection molding method.

Figure 3:
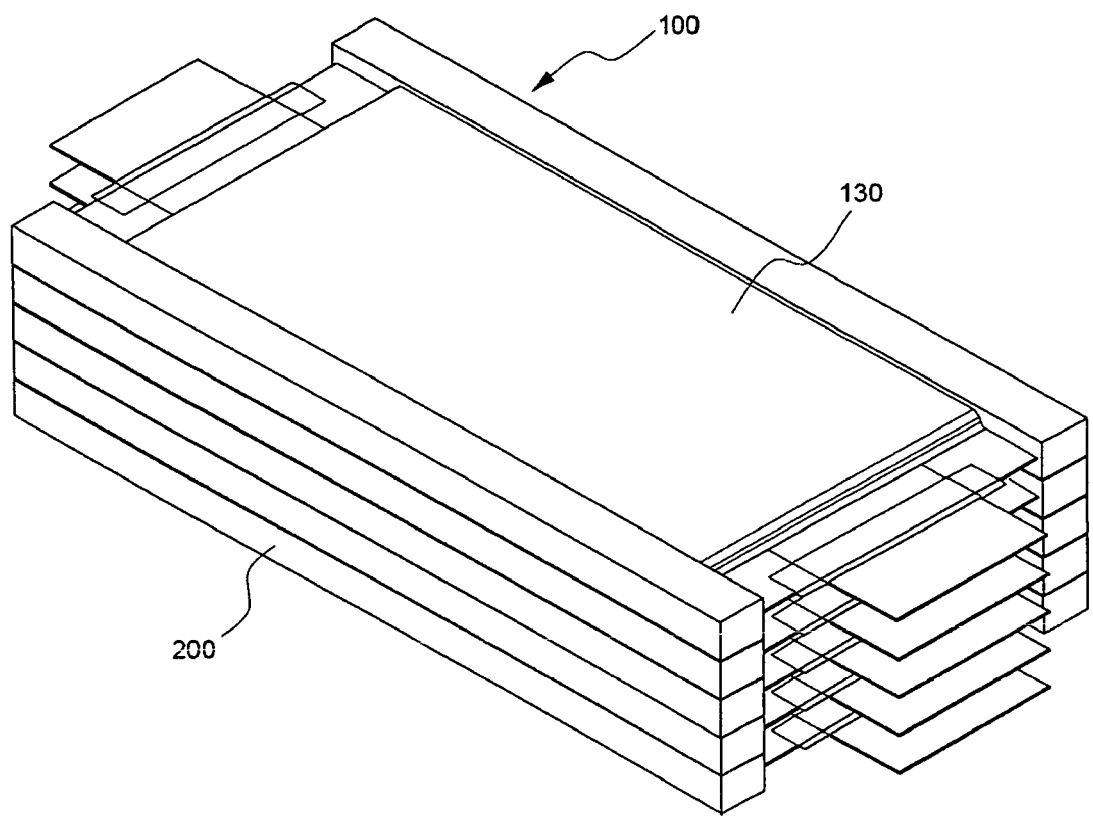
FIGS. 3 and 4 are a perspective view and a front view respectively illustrating a battery module manufactured using the secondary battery shown in FIG. 2 as a unit cell.
Figure 4:
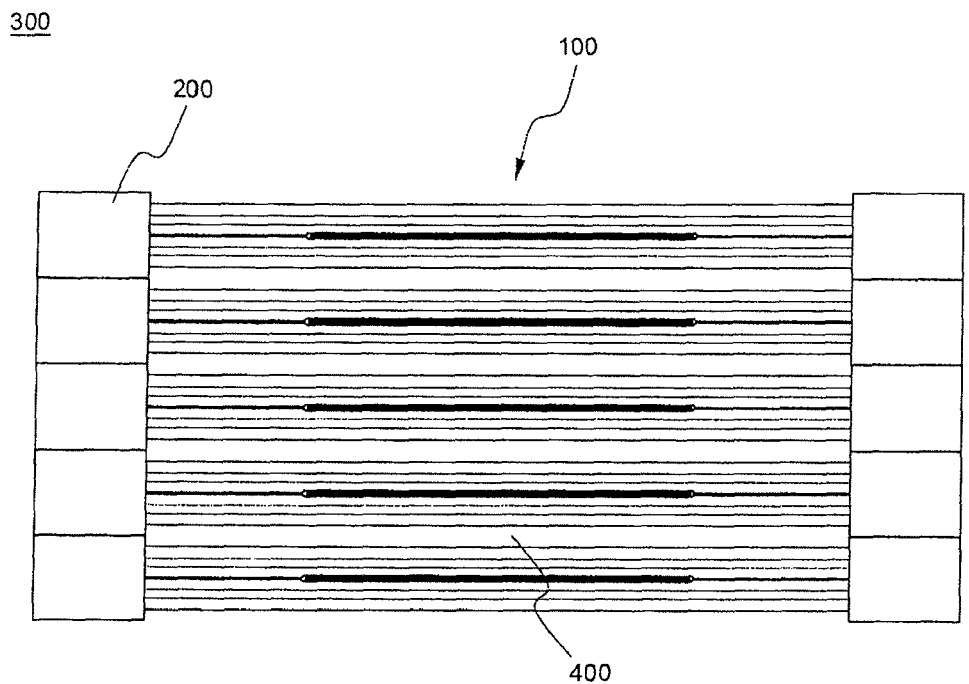

FIGS. 3 and 4 are a perspective view and a front view respectively illustrating a battery module manufactured using the secondary battery shown in FIG. 2 as a unit cell.

Referring to these drawings, the molding part 200 is integrally formed at the opposite side sealing regions of the battery cell 130. Consequently, the unit cells 100 constitute the battery module 300 without using additional members, and coolant flow channels 400, through which a coolant (e.g., air) flows, are formed between the respective unit cells 100.

On the other hand, the battery module 300 may be manufactured by arranging the secondary batteries 100 in the mold at a predetermined interval, before the side molding part 200 is formed at each secondary battery 100 as shown in FIG. 2, and integrally forming the molding part 200 at the opposite side sealing regions of the secondary batteries 100. Specifically, the unit cells 100 are stacked one on another, and then the side molding part is integrally formed at the respective unit cells 100, which is different from the formation of the side molding part as described above. In the finally obtained battery module 300, however, the unit cells 100 are stacked one on another without using additional members, and the coolant flow channels 400 are formed between the unit cells 100, which are the same as the above-described construction.

Figure 5:
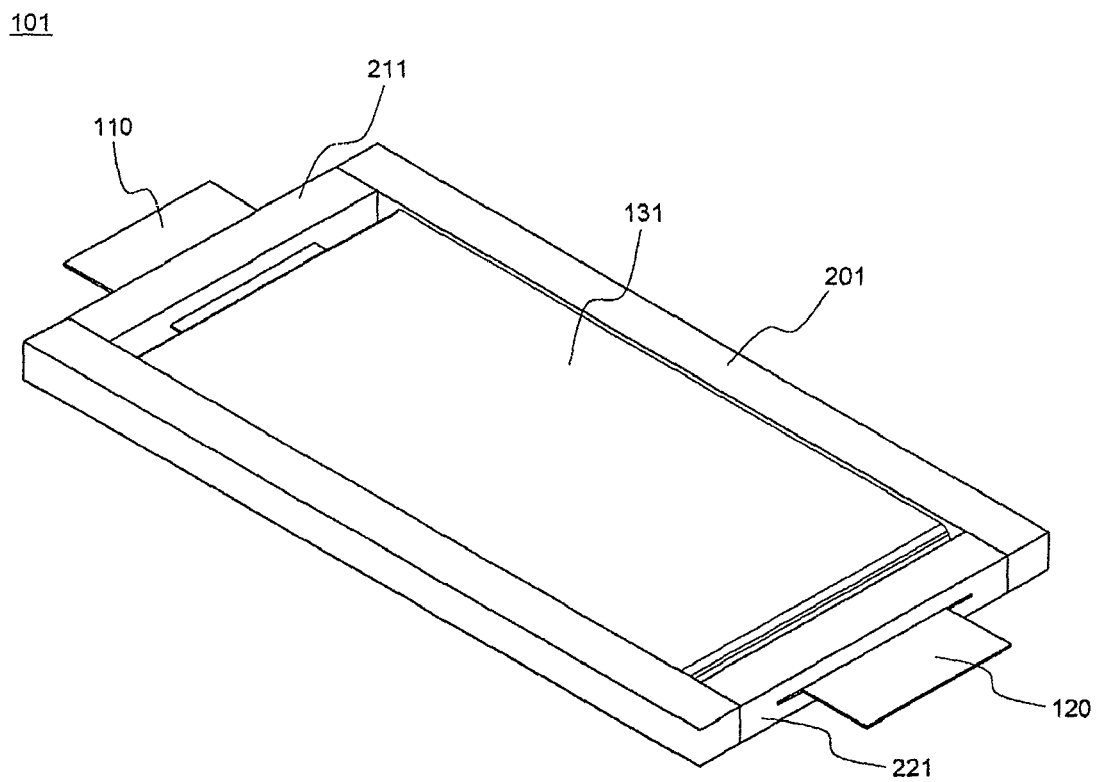
FIG. 5 is a perspective view illustrating a modification of the secondary battery shown in FIG. 3.

FIG. 5 is a perspective view typically illustrating a modification of the secondary battery shown in FIG. 3. The secondary battery 101 has a side molding part 201, which is the same as that shown in FIG. 3, formed at the opposite side sealing regions of a battery cell 131, and molding parts 211 and 221 formed at the upper and lower end sealing regions of the battery cell 131. Specifically, the upper and lower end molding parts 211 and 221 are formed at the upper and lower end sealing regions while electrode leads 110 and 120 protrude from the upper and lower end molding parts 211 and 221, respectively.

The upper and lower end molding parts 211 and 221 may be formed by inserting the secondary battery 101, to which a sealing process has been carried out by thermal welding, into a mold, as described above with reference to FIG. 3, and molding the upper and lower end molding parts 211 and 221.

As another example, the upper and lower end molding parts 211 and 221 may be previously formed as additional members, and then the upper and lower end molding parts 211 and 221 may be coupled to the upper and lower end sealing regions 144 and 146 of the secondary battery 100 shown in FIG. 3. In this case, a coupling structure may be formed at or a bonding agent may be applied to the contact regions of the upper and lower end molding parts 211 and 221 and the side molding part 201 so as to increase the coupling force between the upper and lower end molding parts 211 and 221 and the side molding part 201.

Figure 6:
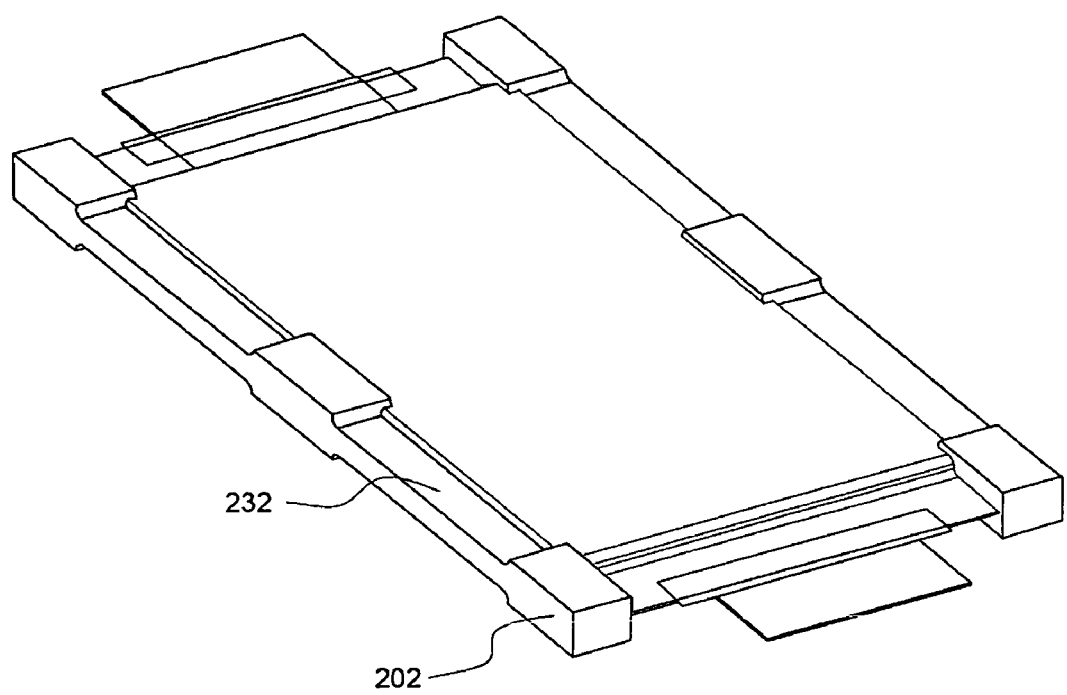
FIG. 6 is a perspective view illustrating a secondary battery according to another preferred embodiment of the present invention.

FIG. 6 is a perspective view illustrating a secondary battery according to another preferred embodiment of the present invention.

The secondary battery 102 shown in FIG. 6 is different from the secondary battery 100 shown in FIG. 3 in that a plurality of depressions 232 are formed at the side molding part 202. The depressions 232 are small-thickness regions of the side molding part 202. The number of the depressions 232 is not particularly restricted.

Figure 7:
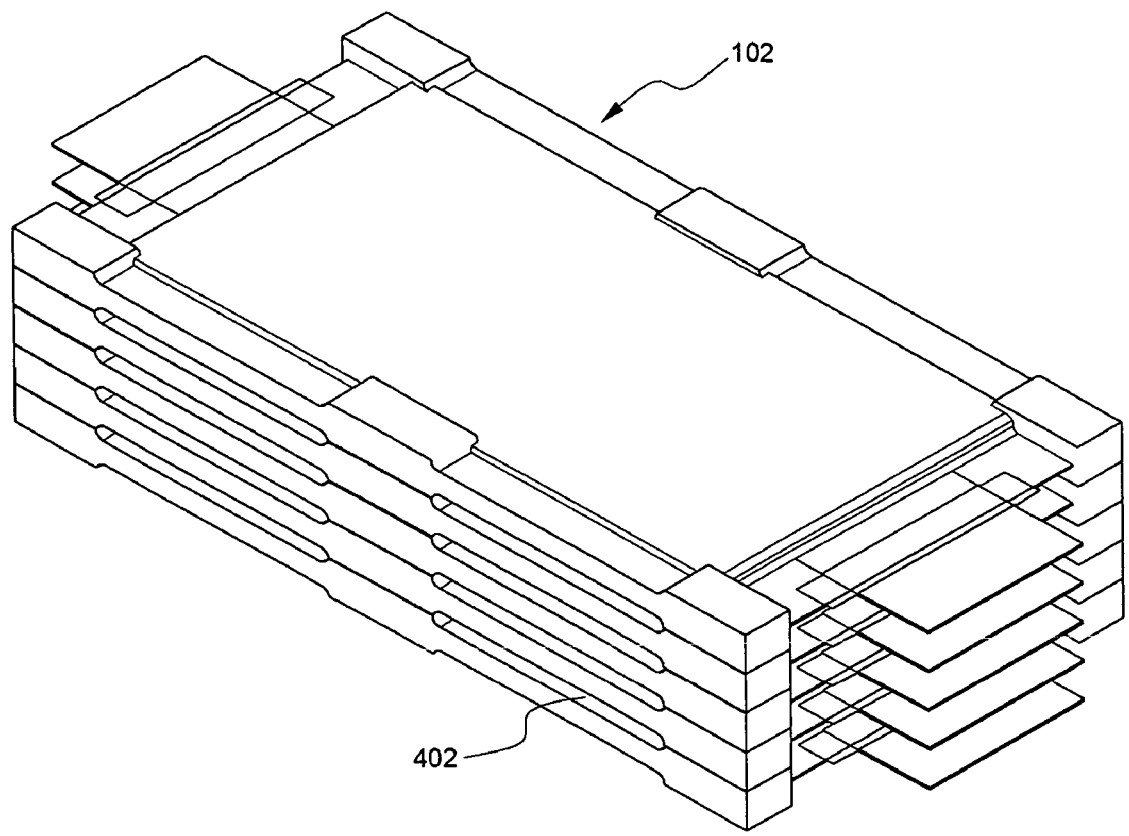
FIG. 7 is a perspective view illustrating a battery module manufactured using the secondary battery shown in FIG. 6 as a unit cell.

When a plurality of secondary batteries 102 are stacked one on another as unit cells so as to constitute a battery module 302 as shown in FIG. 7, coolant flow channels 402 are formed at the opposite sides of the secondary batteries 102 due to the depressions 232, and molding parts are not formed at the upper and lower ends of the secondary batteries 102, whereby open-structure flow channels are formed.

Figure 8:
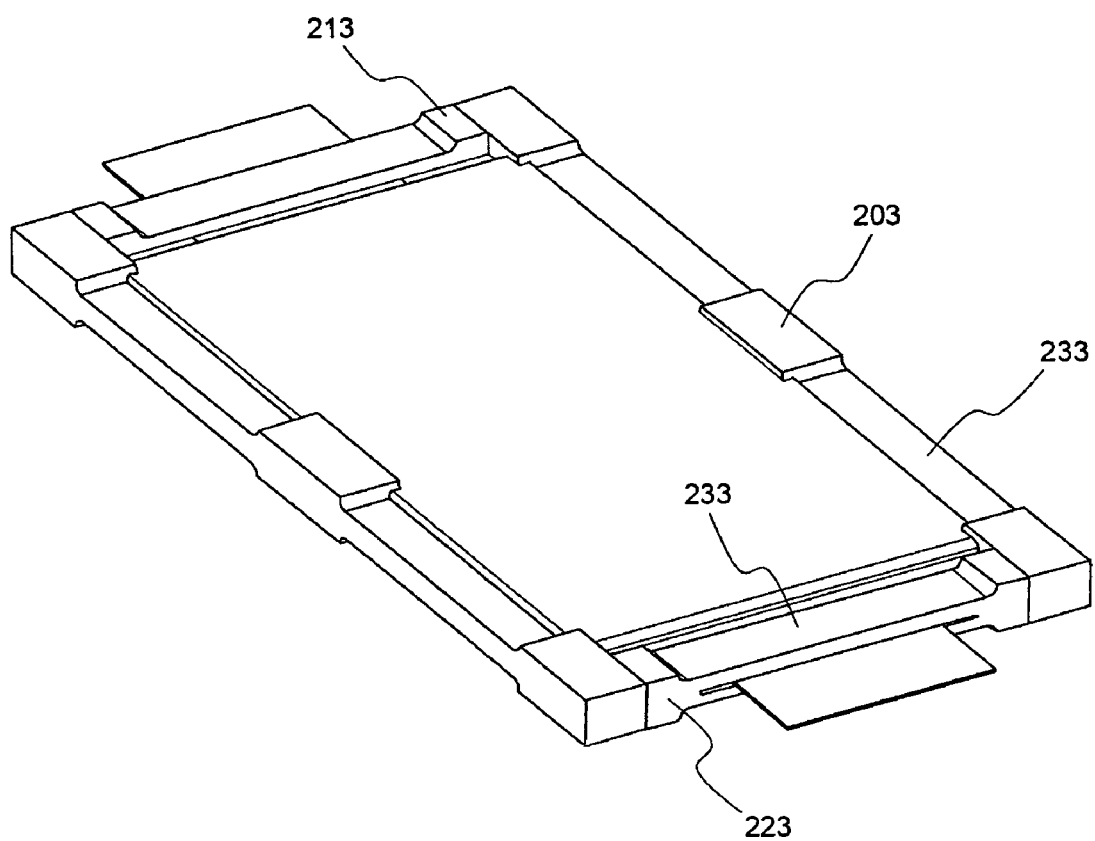
FIG. 8 is a perspective view illustrating a modification of the secondary battery shown in FIG. 6.

Also, referring to FIG. 8, which is a perspective view illustrating a modification of the secondary battery 102 shown in FIG. 6, the depressions 233 are also formed at the upper and lower end molding parts 213 and 223. The secondary battery 103 shown in FIG. 8 is different from the secondary battery 102 shown in FIG. 6 in that the molding parts 213 and 223 are formed at the upper and lower ends of the secondary batteries 103. Also, the secondary battery 103 shown in FIG. 8 is different from the secondary battery 101 shown in FIG. 5 in that the depressions 233 are formed at the side molding part 203 and the upper and lower end molding parts 213 and 223.

Figure 9:
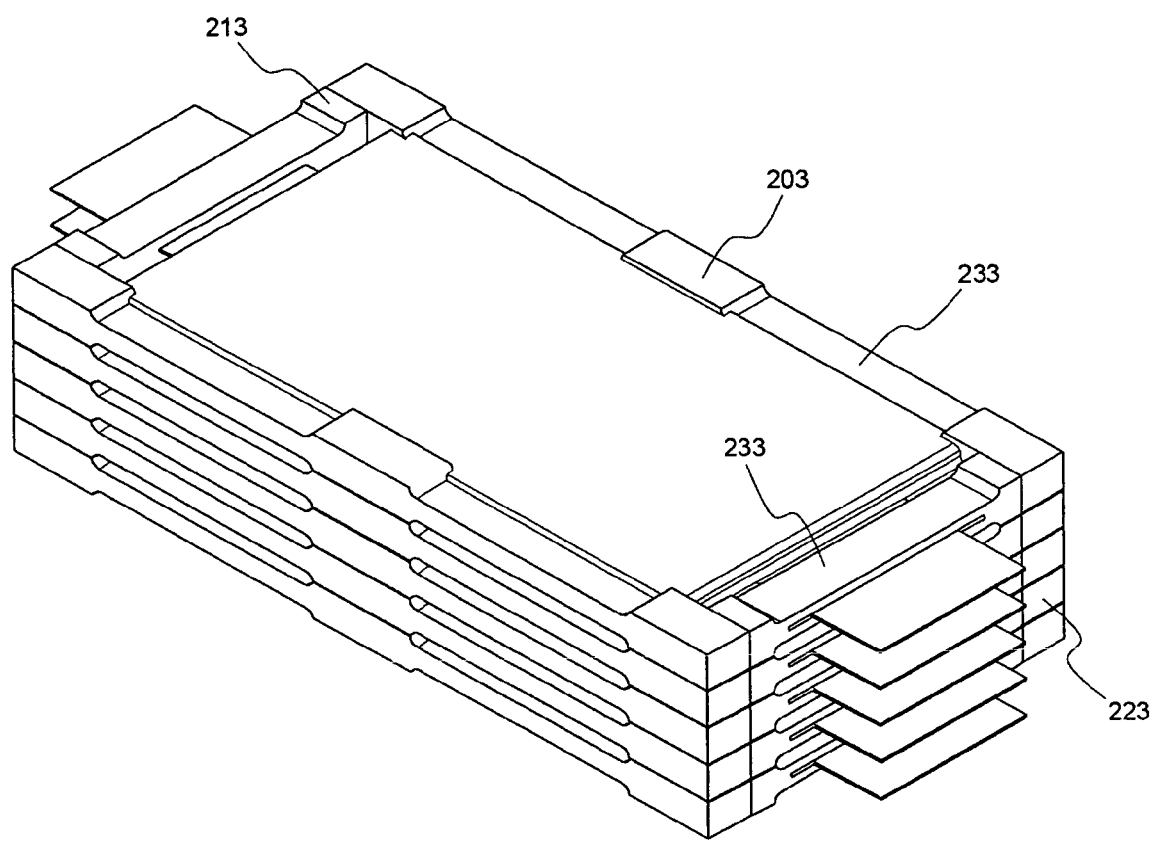
FIGS. 9 to 11 are a perspective view, a front view, and a side view respectively illustrating a battery module manufactured using the secondary battery shown in FIG. 8 as a unit cell.
Figure 10:
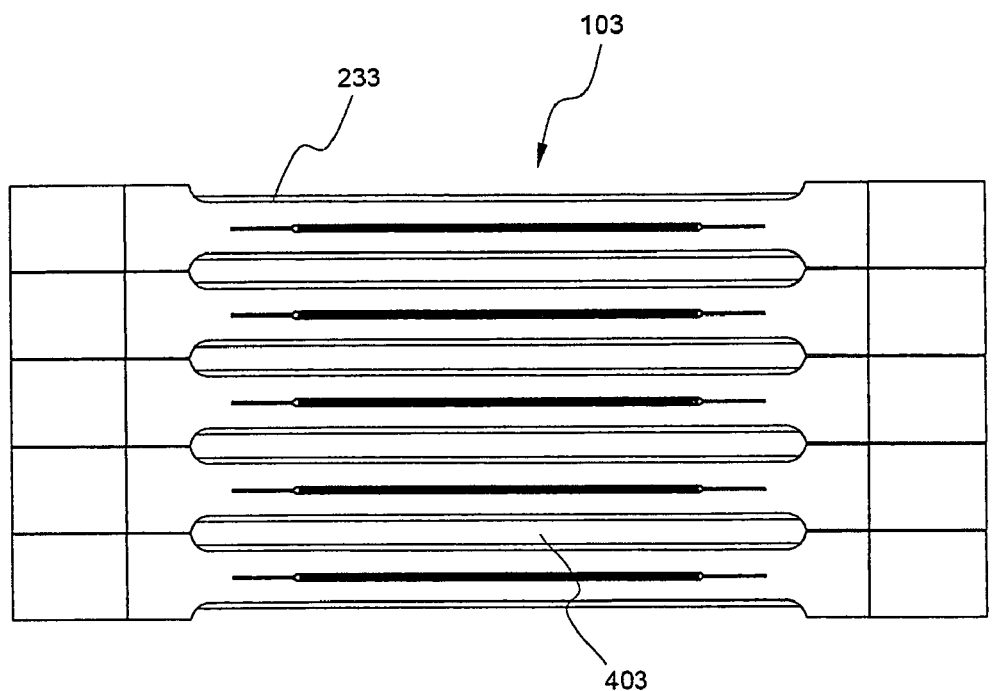
Figure 11:
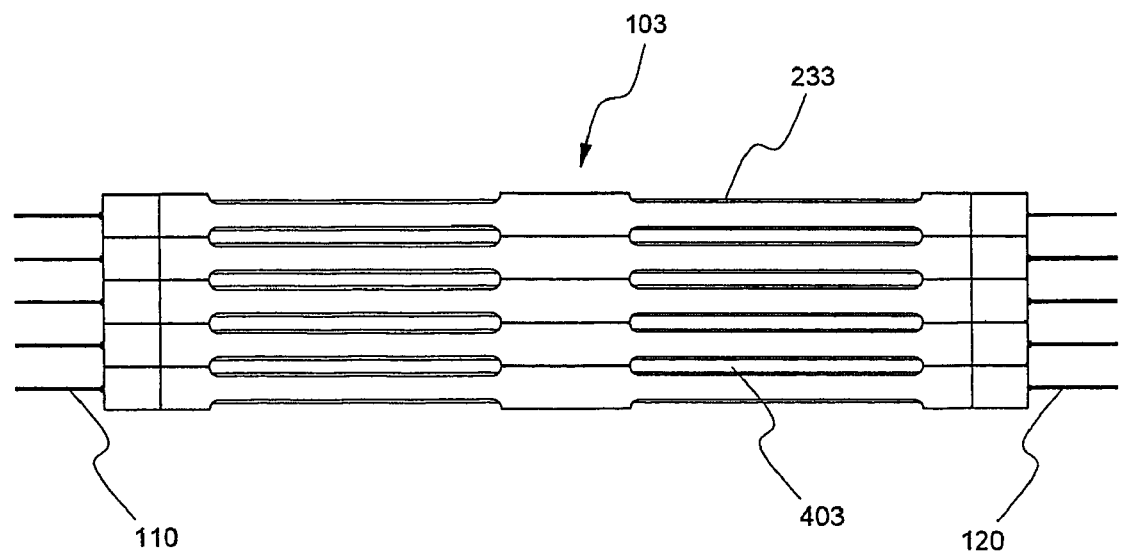

FIGS. 9 to 11 are a perspective view, a front view, and a side view respectively illustrating a battery module manufactured by stacking a plurality of secondary batteries 103, one of which is shown in FIG. 8, one on another as unit cells.

Referring to these drawings, the upper and lower end molding parts 213 and 223 as well as the side molding part 203 are formed at each secondary battery 103, and therefore, the battery module 303 is even more structurally stable. Furthermore, the coolant flow channels 403 are also formed at the upper and lower end of each secondary battery 103 due to the depressions 233 formed at the upper and lower end molding parts 213 and 223. Consequently, heat generated from the unit cells during the charge and the discharge of the unit cells is more effectively removed. Especially, a large amount of heat is generated from the electrode leads 110 and 120 of the secondary batteries 103 during the charge and the discharge of the secondary batteries 103. Consequently, the coolant flow channels 403 formed at the upper and lower end molding parts 213 and 223 greatly assist the heat dissipation of the electrode leads 110 and 120.

Figure 12:
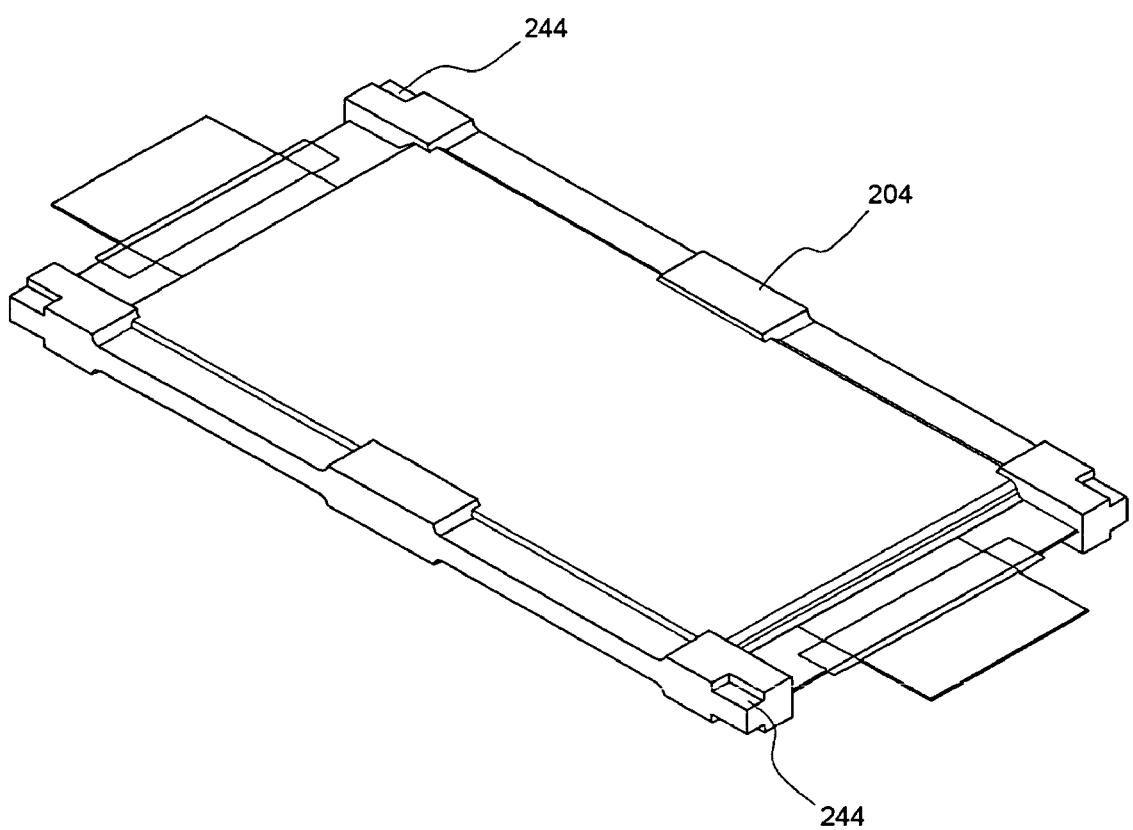
FIGS. 12, 13, and 15 are perspective views illustrating secondary batteries according to other preferred embodiments of the present invention.
Figure 13:
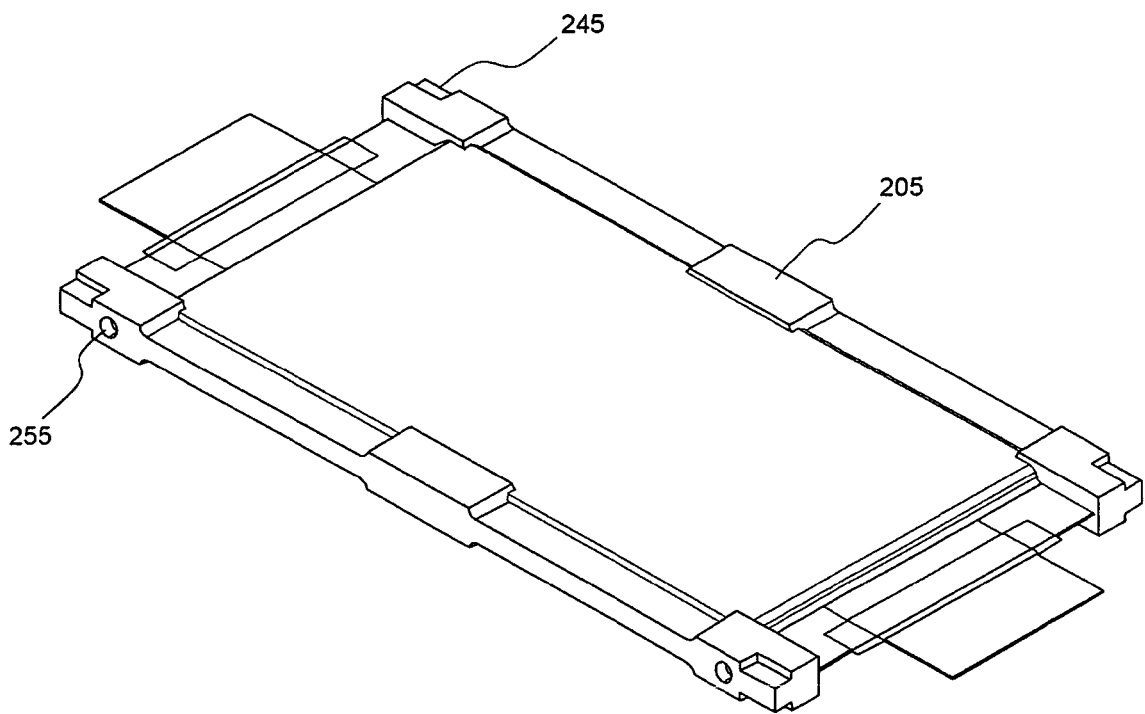
Figure 15:
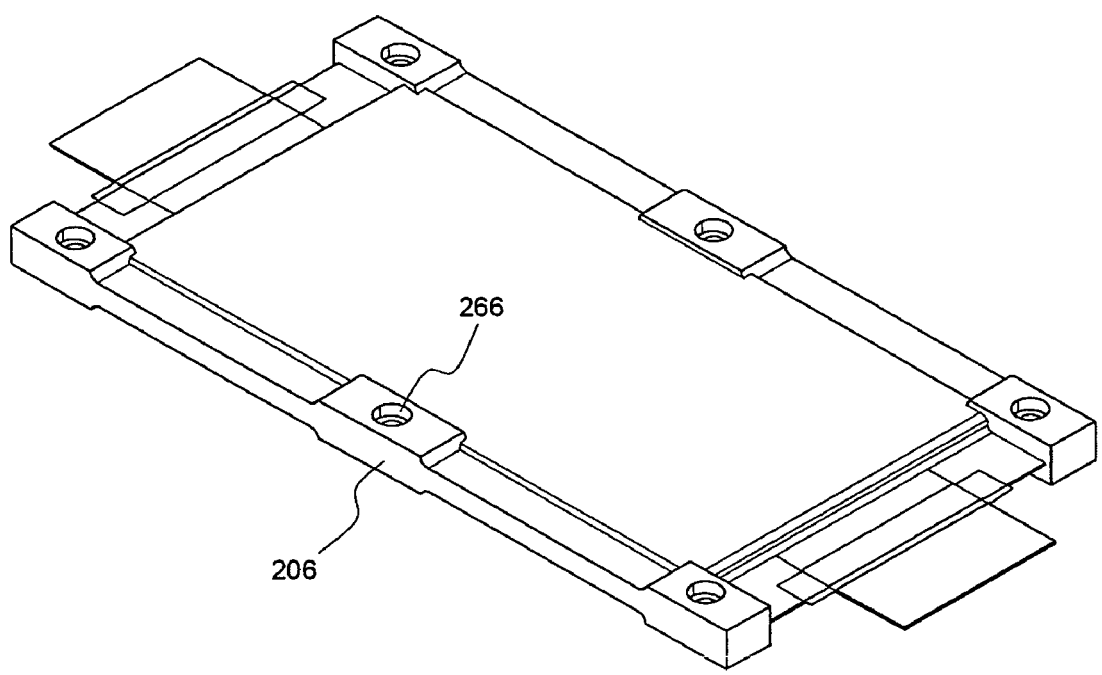

FIGS. 12, 13, and 15 are perspective views typically illustrating secondary batteries according to other preferred embodiments of the present invention.

The secondary battery 104 shown in FIG. 12 has coupling steps 244 formed at the upper and lower ends of a side molding part 204. The secondary battery 105 shown in FIG. 13 has coupling grooves 255 formed at a side molding part 205 in the lateral direction of the secondary battery 105 in addition to coupling steps 245 formed at the upper and lower ends of the side molding part 205. The secondary battery 106 shown in FIG. 15 has through-holes 266 vertically formed through a side molding part 206. These coupling regions assist the secondary batteries 105; 106 to be stably fixed to a battery pack housing (not shown) when the secondary batteries 105; 106 are stacked one on another as the unit cells so as to constitute the battery module 305; 306 as shown in FIG. 14 or 16.

Figure 14:
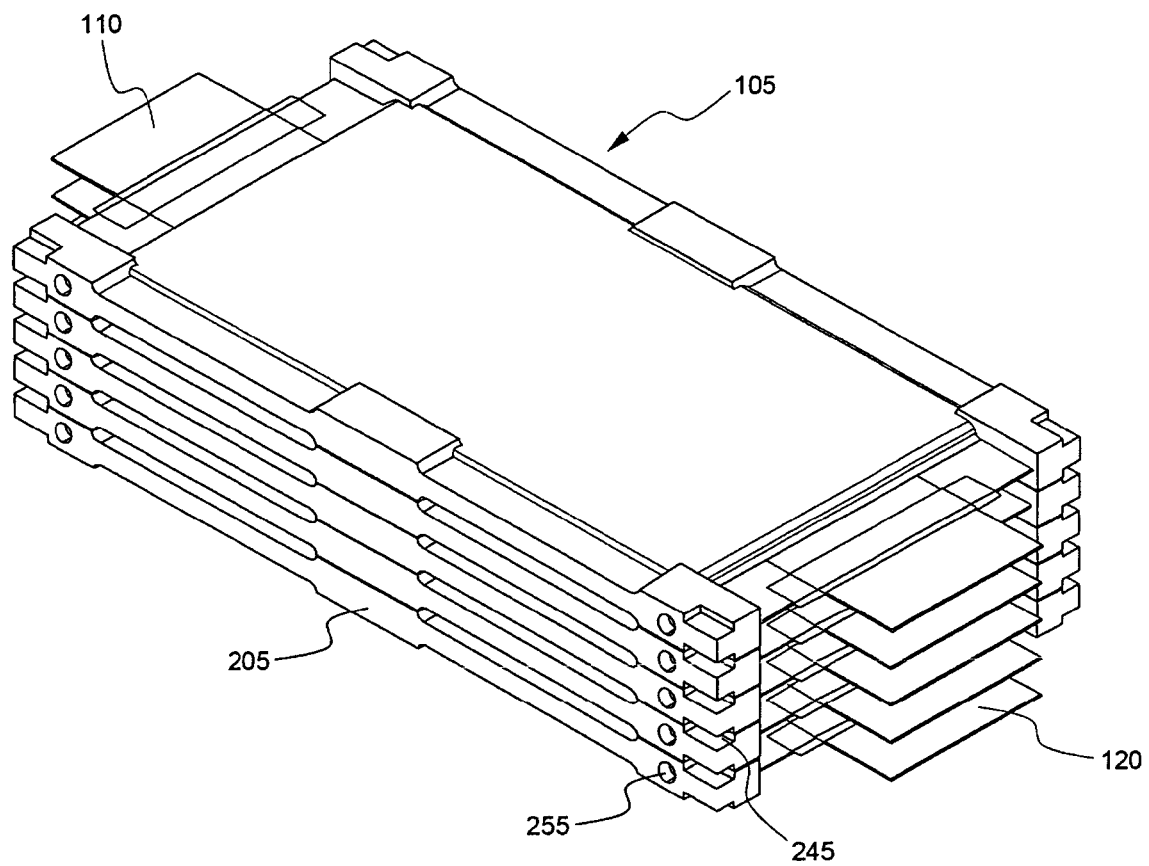
FIG. 14 is a perspective view illustrating a battery module manufactured using the secondary battery shown in FIG. 13 as a unit cell.

For example, referring to FIG. 14, when a plurality of secondary batteries 105, one of which is shown in FIG. 13, are stacked one on another so as to constitute a battery module 305, and the battery module 305 is received in a battery pack housing (not shown) having a receiving space corresponding to the size of the battery module 305, the steps 245 formed at the upper and lower ends of the side molding parts 205 of the secondary batteries 105 are engaged with coupling parts (not shown) formed in the battery pack housing, whereby the secondary batteries are stably fixed. Alternatively, protrusions (not shown) formed in the battery pack housing may be engaged into the coupling grooves 255 of the molding parts 205 such that the secondary batteries 105 are correctly positioned in the receiving space of the battery pack housing, and an additional member having coupling parts, which are engaged with the steps 245, may be coupled to the upper end surface of the battery pack housing, from which the electrode terminals 110 and 120 protrude, so as to constitute the battery pack.

Figure 16:
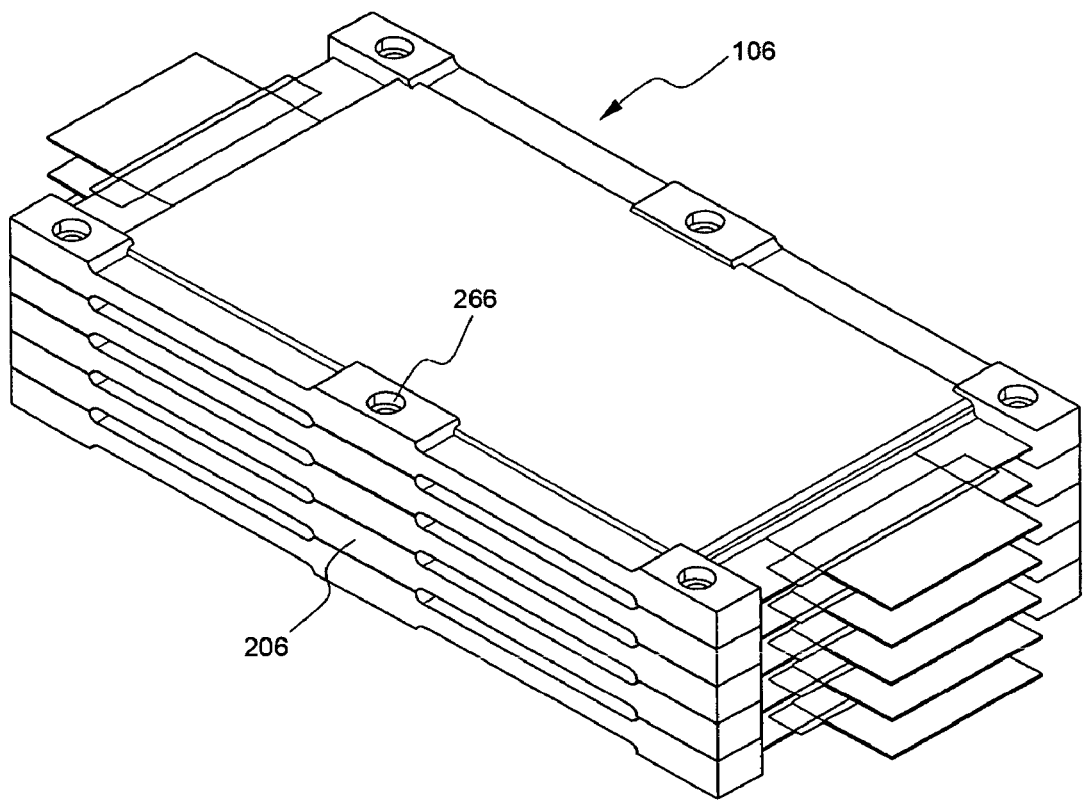
FIG. 16 is a perspective view illustrating a battery module manufactured using the secondary battery shown in FIG. 15 as a unit cell.

As another example, referring to FIG. 16, after the secondary batteries 106 are stacked one on another so as to constitute the battery module 306, fasteners (not shown) are inserted into the through-holes 266, which are vertically formed through the side molding parts 206, such that the secondary batteries 106 are fixed to the battery pack housing (not shown), so as to constitute the battery pack.

As described above, the secondary battery and the battery pack can be constructed in various structures according to the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the molding part is formed at the outside of the sheathing member of the secondary battery. Consequently, the secondary battery according to the present invention has high mechanical strength, and therefore, it is possible to construct a battery pack without using addition members, such as cartridges. When the molding part is formed at the sealing region, which is weak, the molding part increase the mechanical strength and the sealing force of the secondary battery. Consequently, a battery pack including the secondary batteries as unit cells can be manufactured generally in a compact structure and with relatively small weight, and the assembly process of the battery pack is greatly simplified. The battery pack according to the present invention has high structural stability. Consequently, the battery pack can be preferably used as a power source for electric vehicles, hybrid electric vehicles, electric motorcycles, and electric bicycles.

What is claimed is:

1. A secondary battery comprising:
   an electrode assembly which is charged and discharged;
   a sheathing member including a metal layer and a resin layer, the electrode assembly sealed within the sheathing member and the sheathing member including a sealing region surrounding the electrode assembly;
   wherein the secondary battery further comprises:
   a first molding part and a second molding part having a predetermined thickness and respectively overlapping first opposing sides of the sealing region of the sheathing member, the first molding part and the second molding part exposing second opposing sides of the sealing region adjacent to the first opposing sides, wherein each of the first molding part and the second molding part is a single unitary indivisible part facing upper and lower outside surfaces of the sheathing member,
   wherein when a plurality of the secondary battery is stacked on one another, a coolant flow channel is defined by adjacent molding parts, and the coolant flow channel is exposed to an outside of the molding parts.

2. The secondary battery according to claim 1, wherein the first molding part and the second molding part are at least partially formed at an outside sealing region of the sheathing member.

3. The secondary battery according to claim 1, wherein the secondary battery is a pouch-shaped battery, the sheathing member of which is made of a laminate sheet consisting of aluminum and resin.

4. The secondary battery according to claim 1, wherein the sheathing member is constructed
   in a structure in which the electrode assembly is received in a receiving part formed at an upper inner surface and/or an lower inner surface of a one-unit folding type member, and upper and lower contact regions are sealed, or
   in a structure in which the electrode assembly is received in a receiving part formed at the upper inner surface and/or the lower inner surface of a two-unit member, and the upper and lower contact regions are sealed.

5. The secondary battery according to claim 1, further comprising a third molding part and a fourth molding part respectively overlapping the second opposing sides of the sealing region of the sheathing member.

6. The secondary battery according to claim 1, wherein the first molding part and the second molding part have a thickness greater than that of the electrode assembly.

7. The secondary battery according to claim 2, wherein the first molding part and the second molding part respectively overlap an entirety of the first opposing sides of the sealing region of the sheathing member.

8. The secondary battery according to claim 2,
   wherein the first molding part and the second molding part respectively overlap an entirety of the first opposing sides of the sealing region of the sheathing member, and
   further comprising a third molding part and a fourth molding part which respectively overlaps the second opposing sides of the sealing region of the sheathing member.

9. The secondary battery according to claim 1, wherein the first molding part and the second molding part are formed by sealing contact regions of upper and lower sheathing parts of the sheathing member, placing the corresponding outside of the sheathing member in a mold, and injecting a molten material, a thermosetting and/or ultraviolet-setting material, or a dehydration-setting material such that the molten material, the thermosetting and/or ultraviolet-setting material, or the dehydration-setting material can be integrally formed at the corresponding outside of the sheathing member while the molten material, the thermosetting and/or ultraviolet-setting material, or the dehydration-setting material has a predetermined thickness.

10. The secondary battery according to claim 1, wherein the first molding part and the second molding part includes a depression having relatively small thickness on each of upper and lower surfaces of the first molding part and the second molding part, respectively, and when a plurality of the secondary battery is stacked on one another, facing depressions define the coolant flow channel, so as to manufacture a medium- or large-sized battery pack.

11. The secondary battery according to claim 1, wherein the first molding part and the second molding part are each provided with one or more coupling parts, which are selected from a group consisting of coupling steps, coupling grooves, and through-holes, such that, when a plurality of secondary batteries are stacked one on another so as to manufacture a battery pack, the coupling between the stacked batteries is more easily accomplished and/or the stacked batteries can be securely mounted to an interior member for the battery pack.

12. A medium- or large-sized battery pack including a plurality of secondary batteries according to claim 1 as unit cells.

13. The battery pack according to claim 12, wherein the battery pack is manufactured by directly contacting the unit cells, such that the unit cells face each other, without using additional members.

14. The battery pack according to claim 12, wherein the battery pack is manufactured by placing the unit cells in a mold, while the unit cells are arranged at a predetermined interval, and integrally forming the first molding part and the second molding part at at least a portion of the outside of each unit cell.

15. The battery pack according to claim 12, wherein the battery pack is used as a power source for electric vehicles, hybrid electric vehicles, electric motorcycles, or electric bicycles.

16. The secondary battery according to claim 1, further comprising:
   electrode leads which respectively protrude from the second opposing sides of the sealing region; and
   a third molding part and a fourth molding parts having a predetermined thickness and respectively overlapping the second opposing sides of the sealing region from which the electrode leads protrude.

* * * * *